US012579515B2

(12) United States Patent
Morin

(10) Patent No.: US 12,579,515 B2
(45) Date of Patent: * Mar. 17, 2026

(54) SYSTEMS AND METHODS TO TRAIN AND/OR USE A MACHINE LEARNING MODEL TO GENERATE CORRESPONDENCES BETWEEN PORTIONS OF RECORDED AUDIO CONTENT AND WORK UNIT RECORDS OF A COLLABORATION ENVIRONMENT

(71) Applicant: Asana, Inc., San Francisco, CA (US)

(72) Inventor: Steve B. Morin, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/955,264

(22) Filed: Nov. 21, 2024

(65) Prior Publication Data

US 2025/0086590 A1 Mar. 13, 2025

Related U.S. Application Data

(63) Continuation of application No. 17/674,534, filed on Feb. 17, 2022, now Pat. No. 12,190,292.

(51) Int. Cl.
*G06Q 10/101* (2023.01)
*H04N 7/15* (2006.01)

(52) U.S. Cl.
CPC ........... *G06Q 10/101* (2013.01); *H04N 7/155* (2013.01)

(58) Field of Classification Search
CPC .............................. G06Q 10/101; H04N 7/155
See application file for complete search history.

(56) References Cited

U.S. PATENT DOCUMENTS 5,826,252 A 10/1998 Wolters, Jr.
11,095,468 B1 * 8/2021 Pandey ............... H04L 12/1831
(Continued)

OTHER PUBLICATIONS

Geyer, Werner, Heather Richter, and Gregory D. Abowd. "Making multimedia meeting records more meaningful." 2003 International Conference on Multimedia and Expo. ICME'03. Proceedings (Cat. No. 03TH8698). vol. 2. IEEE, 2003. (Year: 2003).*
(Continued)

*Primary Examiner* — Corey Russ
(74) *Attorney, Agent, or Firm* — Esplin & Associates, PC

(57) ABSTRACT

Systems and methods to train a machine learning model to generate correspondences between portions of recorded content and records of a collaboration environment and/or generate correspondences between portions of recorded content and records of a collaboration environment using a trained machine learning model. Exemplary implementations may perform one or more of: manage environment state information maintaining a collaboration environment; obtain correspondence information conveying user-provided correspondences between temporal content of recorded audio content and records; compile the correspondence information and information from records into input/output pairs; train a machine learning model based on the input/output pairs; store the trained machine learning model; provide other information from records and recorded content as input into the trained machine learning model; obtain output from the trained machine learning model including automatically generated correspondence information; and/or other operations.

20 Claims, 4 Drawing Sheets

(56) References Cited

U.S. PATENT DOCUMENTS

| | | | |
|---|---|---|---|
| 11,449,836 B1 | 9/2022 | Clifton | |
| 11,836,681 B1 | 12/2023 | Morin | |
| 11,874,942 B1 * | 1/2024 | Surazski | G06F 16/9535 |
| 12,141,756 B1 | 11/2024 | Beauchamp | |
| 12,218,992 B2 | 2/2025 | Johnson | |
| 2007/0188901 A1 * | 8/2007 | Heckerman | G09B 19/00 |
| | | | 360/23 |
| 2016/0239259 A1 | 8/2016 | Lenchner | |
| 2018/0027006 A1 | 1/2018 | Zimmermann | |
| 2019/0035386 A1 | 1/2019 | Leeb | |
| 2020/0151566 A1 | 5/2020 | Mars | |
| 2020/0293618 A1 * | 9/2020 | Chhabra | G06Q 10/10 |
| 2020/0403817 A1 * | 12/2020 | Daredia | G10L 15/083 |
| 2021/0097502 A1 * | 4/2021 | Hilleli | G06N 3/08 |
| 2021/0157978 A1 | 5/2021 | Haramati | |
| 2021/0166196 A1 | 6/2021 | Lereya | |
| 2021/0383127 A1 | 12/2021 | Kikin-Gil | |
| 2023/0073552 A1 | 3/2023 | Hamze | |
| 2023/0094828 A1 * | 3/2023 | Ramsl | G10L 25/54 |
| | | | 704/235 |
| 2024/0112008 A1 | 4/2024 | Malik | |
| 2024/0296399 A1 | 9/2024 | Garg | |
| 2024/0346449 A1 | 10/2024 | Beauchamp | |
| 2024/0362590 A1 | 10/2024 | Lilley | |
| 2024/0378560 A1 | 11/2024 | Morin | |
| 2024/0428195 A1 | 12/2024 | Hood | |
| 2025/0021524 A1 | 1/2025 | Davies | |
| 2025/0078034 A1 | 3/2025 | Lilley | |
| 2025/0111338 A1 | 4/2025 | Morin | |

OTHER PUBLICATIONS

K. Miao, O. Biermann, Z. Miao, S. Leung, J. Wang and K. Gai, Integrated Parallel System for Audio Conferencing Voice Transcription and Speaker Identification, 2020, 2020 International Conference on High Performance Big Data and Intelligent Systems (HPBD &IS) pp. 1-8, (Year: 2020).

Y. Shi, C. Bryan, S. Bhamidipati, Y. Zhao, Y. Zhang and K.-L. Ma, "MeetingVis: Visual Narratives to Assist in Recalling Meeting Context and Content," 2018, IEEE Transactions on Visualization and Computer Graphics, vol. 24, No. 6, pp. 1918-1929, (Year: 2018).

An innovative way for document and work item management in agile development process; May 10, 2013; IP.com; IPCOM000227667D. 5 pages.

* cited by examiner

408

400

RecordA

402

404

406

500

501

502

Prepare first draft of ad for the XYZ Inc.

Assigned to: Steve

Due Date : Dec 30

505

503

504

Description :

New client XYZ Inc. hired us to design a series of ads for their headphones.
    - Listen to meeting recording *here*

506

SYSTEMS AND METHODS TO TRAIN AND/OR USE A MACHINE LEARNING MODEL TO GENERATE CORRESPONDENCES BETWEEN PORTIONS OF RECORDED AUDIO CONTENT AND WORK UNIT RECORDS OF A COLLABORATION ENVIRONMENT

FIELD OF THE DISCLOSURE

The present disclosure relates to improvements within a technical field of operating a virtual collaboration environment, in particular, systems and methods to train and/or use a machine learning model to generate correspondences between portions of recorded audio content and work unit records of a collaboration environment.

BACKGROUND

Web-based collaboration environments, sometimes referred to as work management platforms, may enable users to assign projects, tasks, or other work assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based virtual collaboration environment poses many challenges. For example, operating the collaboration environment may require precise ways of creation, storage, management, and/or provision of information that makes up the collaboration environment. One or more ways that operators look to improve the operation of the collaboration environment may be in the way information is defined and stored in records that make up the virtual collaboration environment and/or in the user interfaces that present information and/or provide access to the records. For example, users may traditionally manually define records for work within the collaboration environment. The operators of the collaboration environment are therefore tasked with finding ways to design and configure user interfaces which would provide user-friendly and intuitive ways to receive this manual input. However, even with some improvements to the user interfaces that walk through manual generation of work unit records, the requirement for human-machine interactions is time consuming, may cause decreased work-flow efficiency, and/or may be prone to user error. Further, some records may be created by the users from some reference material. For example, after a recorded video or audio meeting or dictation, a user may generate one or more records that reflect the work to be done following the recording. A user tasked with completing and/or organizing work may often refer back to the recording in order to obtain context for work to be done and/or simply to refresh their memory. However, the recording may be too long and/or may include information that may not be relevant to the particular work they are participating in. For example, multiple items of work may be derived from a single recording. A user working on a single item of work may not have a need or desire to review or revisit an entirety of the recording, such that searching through the recording to find a relevant part may be time consuming.

To address these and/or other problems, one or more implementations presented herein propose a technique to generate correspondences between portions of recorded content (audio and/or video content) and individual records. The recorded content may have been recorded asynchronously with respect to the generation of the correspondences. The recorded content may be referred to as "asynchronous audio and/or video." One or more records may be automatically generated based on the recorded content and/or generated by the users based on recorded content. Correspondences between portions of the recorded content (referred to as "temporal content") may be provided by the users and/or generated by a trained machine learning model. The correspondences may be associated with individual records so that users accessing the records through one or more user interfaces of the collaboration environment may be able to quickly jump to the portion(s) of the recorded content that are relevant to the particular work they are participating in.

One or more aspects of the present disclosure include a system to train a machine learning model to generate correspondences between portions of recorded content and records of a collaboration environment. One or more aspects of the present disclosure include a system to generate correspondences between portions of recorded audio content and work unit records of a collaboration environment using a trained machine learning model. A system may include one or more hardware processors configured by machine-readable instructions and/or other components. Executing the machine-readable instructions may cause the one or more hardware processors to facilitate training a machine learning model to generate correspondences between portions of recorded content and records of a collaboration environment and/or generating correspondences between portions of recorded audio content and work unit records of a collaboration environment using a trained machine learning model. The machine-readable instructions may include one or more computer program components. The one or more computer program components may include one or more of an environment state component, a user interface component, a machine learning component, and/or other components.

The environment state component may be configured to manage environment state information maintaining a collaboration environment. The collaboration environment may be configured to facilitate interaction by users with the collaboration environment. The environment state information may include one or more records. The one or more records may include one or more of work unit records, project records, objective records, and/or other records. The work unit records may include work information and/or other information. The work information may characterize units of work created, managed, and/or assigned to within the collaboration environment to the users who are expected to accomplish one or more actions to complete the units of work. The work information may comprise values of work unit parameters characterizing the units of work.

The user interface component may be configured to obtain correspondence information and/or other information. Correspondence information may convey user-provided correspondence between temporal content of recorded content and one or more records. Recorded content may include recorded audio content and/or recorded video content. Recorded video content may include recorded audio content and recorded visual content. The recorded content may include utterances by one or more users. The temporal content may correspond to individual points in time and/or individual periods of time within the recorded content.

The machine learning component may be configured to compile the correspondence information and information in one or more records into input/output pairs. The input/output pairs may include training input information, training output information, and/or other information. The training input information for an individual input/output pair may include the correspondence information for individual recorded content and individual record. The training output information for the individual input/output pair may include information in the individual record. By way of non-limiting illustration, the training output information may include the work information for an individual one of the work unit records and/or other records.

The machine learning component may be configured to train a machine learning model based on the input/output pairs to generate a trained machine learning model. The trained machine learning model may be configured to generate correspondences between temporal content of recorded content and one or more records. In some implementations, trained machine learning model may be applied to records and recorded content that may not already have specified correspondences (e.g., records and/or recorded content not already used in the training of the machine learning model). The machine learning component may be configured to store the trained machine learning model.

The machine learning component may be configured to apply the trained machine learning model to records and/or recorded content to automatically generate correspondences. By way of non-limiting illustration, the user interface component may be configured to obtain input information and/or other information. The input information may include digital assets defining recorded content. For example, users may upload a digital asset defining recorded content to be applied with the trained machine learning model in combination with one or more records.

The machine learning component may be configured to provide information from existing records and recorded content as input into the trained machine learning model. The trained machine learning model may be configured to provide output including correspondence information including correspondences between temporal content of the recorded content and the records, and/or other information. The machine learning component may be configured to obtain the output from the trained machine learning model. The machine learning component may be configured to store the correspondence information in the records.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
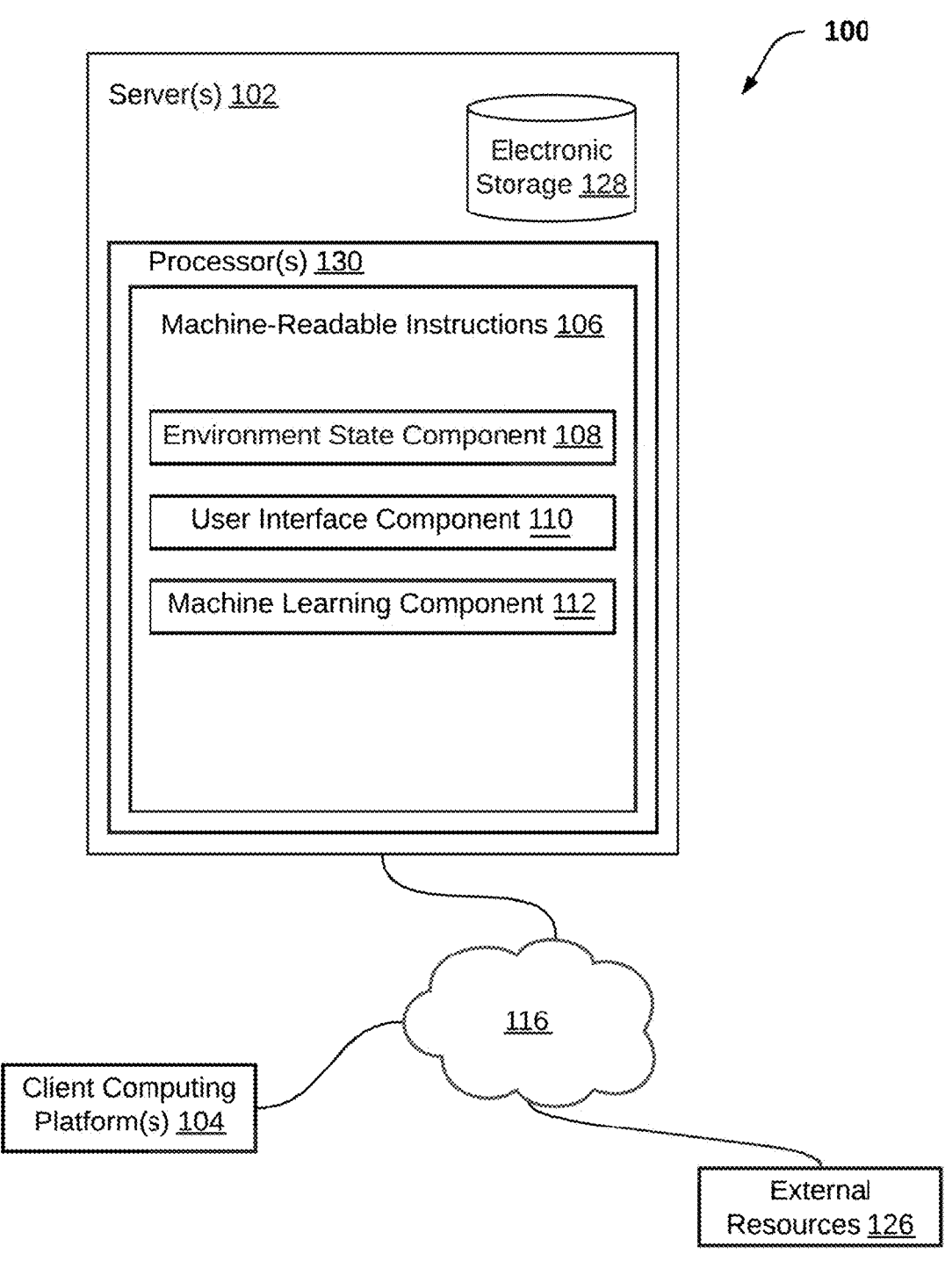
FIG. 1 illustrates a system configured to train a machine learning model to generate correspondences between portions of recorded content and records of a collaboration environment and/or generate correspondences between portions of recorded content and records of a collaboration environment using a trained machine learning model, in accordance with one or more implementations.

FIG. 1 illustrates a system 100 configured to train a machine learning model to generate correspondences between portions of recorded content and records of a collaboration environment and/or generate correspondences between portions of recorded content and records of a collaboration environment using a trained machine learning model, in accordance with one or more implementations. Correspondences may be associated with individual records so that users accessing the records through one or more user interfaces of the collaboration environment may be able to quickly jump to the portion(s) of the recorded content that are relevant to the particular work they are participating in.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to train a machine learning model to generate correspondences between portions of recorded content and records of a collaboration environment and/or generating correspondences between portions of recorded content and records of a collaboration environment using a trained machine learning model. The computer program components may include one or more of an environment state component 108, user interface component 110, a machine learning component 112, and/or other components.

Environment state component 108 may be configured to manage environment state information and/or other information used in maintaining a collaboration environment. The collaboration environment may be configured to facilitate interaction by users with the collaboration environment and/or each other. The environment state information may include one or more records for work. The one or more records may include one or more of user records, work unit records, project records, objective records, and/or other records. The user records may include user information describing the users of the collaboration environment. The work unit records which may include work information describing units of work assigned to, created by, and/or managed by the users within the collaboration environment. The project records may include project information describing projects created, assigned, and/or managed within the collaboration environment. An individual project may be associated with individual sets of the units of work supporting the individual projects. The objective records may include objective information describing business objectives specified within the collaboration environment.

The user information in the user records may include values of user parameters and/or other information. The values of the user parameters may be organized in the user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, and/or other information.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the one or more work unit parameters may include one or more of a work assignment parameter, work completion parameter, a work management parameter, work creation parameter, dependency parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

In some implementations, values of work unit parameters may include one or more of a unit of work name, a unit of work description, user role information, one or more unit of work dates (e.g., a start date, a due date or end date, a completion date, and/or dates), project inclusion (e.g., identification of projects supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency, one or more custom fields (e.g., priority, cost, stage, and/or other custom fields), and/or other information.

The values of the work assignment parameter describing assignment of users to units of work may be determined based on one or more interactions by one or more users with a collaboration environment. In some implementations, one or more users may create and/or assign one or more units of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects managed within the collaboration environment. The project parameters may characterize one or more projects created, assigned, and/or managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client and the units of work under the individual project heading may be work directly contributing to the fulfillment of a business relationship with the client.

The values of the project parameters may, by way of non-limiting example, include one or more of: one or more units of work within individual ones of the projects (which may include values of work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, projects created by, assigned to, and/or completed by the users may refer generally to a linking of the projects with the individual users in the collaboration environment. A project may be linked with a user in a manner that defines one or more relationships between the user and the project. Such a relationship may connote and/or be a result of an action (past, present, and/or future) of the user with respect to the project. Such actions may include one or more of creating a project record for a project, being assigned to participate in a project, participating in a project, being granted access to a project record of a project, adjusting a value of a project parameter of a project record of a project, being assigned a project-level role, and/or other actions.

User role information may specify individual roles of the individual users. A role may represent a position of an individual user. The position may be specified based on a description of one or more of a job title, level, stage, and/or other descriptions of position. The role may be specified with respect to a business organization as a whole and/or other specifications. By way of non-limiting illustration, a role may include one or more of chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within the units of work and/or the projects. The roles may convey expected contribution of the users in completing and/or supporting the units of work and/or the projects. The individual roles of individual users within the units of work may be specified separately from the individual roles of the individual users within the projects. The individual roles of individual users within the units of work and/or projects may be specified separately from the individual roles of the individual users within a business organization as a whole.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and/or identify sets of work unit records and/or project records that support the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

Progress information for the individual business objectives may convey progress toward fulfillment of the individual business objectives. The progress information for the individual business objectives may convey progress toward fulfillment of the individual business objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual business objectives may be determined independently from incremental completion of the units of work in the individual sets of units of work associated with the individual business objectives. The completion of the units of work associated with a given business objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

It is noted that metadata and/or values of parameters related to users, projects, business objectives, and/or units of work may be considered values of user parameters, project parameters, objective parameters, and/or work unit parameters.

In some implementations, environment state component 108 may be configured to manage information defining pages corresponding to the individual records. The individual pages may provide access to the individual records. By way of non-limiting illustration, work unit pages may provide access to work unit records; project pages may provide access to project records; objective pages may provide access to objective records. Managing information defining pages may include determining, obtaining, and/or modifying information used to generate pages. Managing information defining individual pages may include providing information to the user interface component 110 to effectuate presentation of the pages, and/or other information. In some implementations, individual pages may include individual sets of interface elements displaying the values of one or more of the parameters of the individual records. In some implementations, access to records via pages may include one or more of viewing information in the records, changing information in the records, deleting information in the records, and/or other actions.

User interface component 110 may be configured to obtain correspondence information and/or other information. The correspondence information may include user-provided correspondences and/or automatically generated correspondences. The correspondences may be between temporal content of recorded content and one or more of the records. Recorded content may include recorded audio content and/or recorded video content. Recorded video content may include recorded audio content and recorded visual content. The recorded audio content may include utterances by one or more of users and/or other sounds. The temporal content may correspond to points in time and/or periods of time within the recorded audio content. In some implementations, points in time and/or periods of time may be defined by one or more time stamps within the recorded content.

In some implementations, a correspondence between temporal content of recorded content and a record may indicate the record was generated based on, and/or is relevant to, the temporal content. The correspondence may indicate the temporal content of the recorded content includes information pertaining and/or relevant to the record, and/or indicate other relationships between the temporal content of the recorded content and the record.

In some implementations, user utterances included in recorded content may include speech, emotes, and/or other vocalizations. An individual utterance may include one or more of a spoken word, a statement, a vocal sound, and/or other considerations. Other sounds may include environmental noise and/or other sounds.

In some implementations, recorded audio content may be included in and/or extracted from recorded video content (i.e., meetings, presentations, tutorials, etc.), and/or other types of content. The recorded video content may include visual content. The visual content may include one or more of individual images comprising frames of a video, sets of images comprising a series of frames, and/or other content. The recorded video content may depict one or more of real-world users, real-world environment, digital content, and/or other content. In some implementations, recorded video content may include time stamps associated with the recorded visual content and recorded audio content. The time stamps may provide a synchronization between the recorded visual content and recorded audio content. In some implementations, the temporal content of recorded content may include the time stamps associated with a combination of recorded audio content and recorded visual content.

In some implementations, user interface component 110 may be configured to effectuate presentation of instances of a user interface on client computing platform(s) 104 associated with the users. The users may access the recorded content and/or provide user input through the instances of the user interface. The user interface may include one or more portions. A portion may include an input portion configured to receive user input of digital assets defining recorded content. In some implementations, the input portion may be configured to receive user input through drag-and-drop input, file selection through a search and/or drop-down menu, and/or other input. A portion may include playback portion through which a user may view and/or listen to the recorded content. The playback portion may be configured to receive user input including identification of the temporal content for the correspondences. The playback portion may include a temporal selection portion (e.g., sliding bar and/or other interface element(s)) to direct the recorded content to one or more points in time. A user may provide input to save and/or timestamp one or more points in time. A user may input to save and/or timestamp a section of the recorded content between multiple points in time to specify a period of time within the recorded content. The input may be facilitated, for example, by selecting a virtual button and/or other input. A portion may be provided where a user can select and/or input a particular record (e.g., by title and/or other identifying information) to associate with the point in time and/or period in time thereby specifying a user-provided correspondence.

By way of non-limiting illustration, user interface component 110 may present a first instance of the user interface on a first client computing platform associated with a first user. The first instance of the user interface may provide the first user with access to the first recorded content and/or other recorded content to input one or more correspondences with one or more records.

The user interface component 110 may be configured to obtain user input information and/or other information. The user input information may convey the user input into the instances of the user interface. In some implementation, user input information may include one or more of inputting digital assets defining recorded content, identifying temporal content of the recorded content, identifying correspondences between the temporal content and one or more records, and/or other input. In some implementations, digital assets may include one or more video files, audio files, text files, and/or other digital assets that define the recorded content.

By way of non-limiting illustration, first correspondence information may convey a first correspondence between first temporal content of first recorded content and a first work unit record and/or other records. Second correspondence information may convey a second correspondence between second temporal content of the first recorded content and a second work unit record and/or other records. In some implementations, the first correspondence, the second correspondence, and/or other correspondences may be provided by one or more users. For example, the first correspondence may be specified based on first user input including an identification of the first temporal content and the first work unit record for the first correspondence; and the second correspondence may be specified based on second user input including an identification of the second temporal content and the second work unit record for the second correspondence.

In some implementations, presentation of the instances of the user interface through which the users access the recorded content may be limited to the users that are linked to the recorded content. The users that are linked to the recorded content may include one or more of creators of the recorded content, assignees of individual ones of the records created from the recorded content, one or more of the users who participated in the recorded content, users specifically authorized, and/or other users. Access to the recorded content may allow the users to view, edit, and/or otherwise interact with the recorded content. In some implementations, permissions defining user access to the recorded content may be stored in records for work linked to the recorded content.

User-provided correspondences may be a robust and effective way to correlate records for work and portions of recorded content. For example, users may be able to quickly and effectively identify what points in time and/or periods in time are relevant to their work, and what parts are not. Since a typical meeting between users may not always be linear in nature, it is otherwise difficult to determine what portions of recorded audio content are actually going to be helpful to users who are tasked with doing or organizing the follow-up work. For example, users may find it helpful to include portions of a recording that lead up to a part that specifically discusses work to be done, and/or portions that also lead away from the part that specifically discusses work to be done. This additional context to the recording may aid the user in completing and/or organizing the resulting work, especially when they find it helpful to refer back to the recording. In some implementations, machine learning may be applied to automatically generate work from the recordings based on transcripts of the records. While such automation may be able to quickly identify a part in a record that specifically leads to the generation of a record for work, such machine implementations may not typically have the intuition to identify a portion that is actually the most helpful. Accordingly, training a machine learning model to generate correspondences based on how users themselves identify the correspondences may provide a trained machine learning model that provides a vast improvement in the effectiveness and efficiency of the collaboration environment and how recorded audio content is kept in the system.

Machine learning component 112 may be configured to compile the user-provided correspondence information and information from one or more records into input/output pairs to train a machine learning model. The information from the one or more records may include one or more of title, description, assignee, assignor, creator, due date, start date, and/or other information (e.g., values of one or more parameters). The training of the machine learning model may adapt the model to learn the type of intuition that users use when specifying correspondences themselves. Accordingly, as users continue to provide more correspondences, the more the machine learning model is able to learn. Further, the results of using the trained machine learning model to generate correspondences, with or without correction/adjustments by users to refine the model, may be fed back into the trained model to further refine it.

In some implementations, input/output pairs may include training input information, training output information, and/or other information. The training input information for an individual input/output pair may include the user-provided correspondence information for an individual record and temporal content within an individual recorded content. The training output information for the individual input/output pair may include information from the individual record. By way of non-limiting illustration, the first correspondence information and the work information for the first work unit record may be compiled into a first input/output pair. The second correspondence information and the work information for the second work unit record may be compiled into a second input/output pair. The quantity of training input data may be indicated based on the participation of users to provide user-provided correspondences. Further, as will be described in more detail herein, the output produced by the trained machine learning including automatically generated correspondences may be confirmed and/or corrected by users to further refine the model.

In some implementations, input/output pairs may be derived from records and user-provided correspondence information associated with some or all users of the system 100, and used to train a machine learning model that applies to some or all users. In some implementations, input/output pairs may be tailored to specific sets of users so that the specific sets of users have a trained machine learning model that is particularly adapted to them. By way of non-limiting illustration, input/output pairs may be derived from records and user-provided correspondence information specific to a set of users and used to train a machine learning model that is specific to the set of users. By way of non-limiting illustration, a set of users may be associated with a given business entity such that the business entity may have an account within system 100 which provides access to the set of users (e.g., it's employees). The input/output pairs may be derived from information specific to the set of users such that the resulting trained machine learning model may be particularly adapted to the set of users. By adapting the machine learning model to a specific set of users, the output from the training machine learning model may be more accurate and/or relevant for that set of users.

Machine learning component 112 may be configured to train the machine learning model based on the input/output pairs to generate a trained machine learning model. The trained machine learning model may thereafter be configured to automatically generate correspondences between temporal content of recorded content and one or more records not yet having correspondences. By way of non-limiting illustration, the machine learning model may be trained using the first input/output pair, the second input/output pair, and/or other input/output pairs to generate the trained machine learning model.

In some implementations, the machine learning model may utilize one or more of an artificial neural network, naïve bayes classifier algorithm, k-means clustering algorithm, support vector machine algorithm, linear regression, logistic regression, decision trees, random forest, nearest neighbors, and/or other approaches. Machine learning component 112 may utilize deep learning techniques and/or other techniques. Machine learning component 112 may utilize techniques such as one or more of supervised learning, semi-supervised learning, unsupervised learning, reinforcement learning, and/or other techniques.

In supervised learning, the model may be provided with known training dataset that includes desired inputs and outputs (e.g., the input/output pairs described herein), and the model may be configured to find a method to determine how to arrive at those outputs based on the inputs. The model may identify patterns in data, learn from observations, and make predictions. The model may make predictions and may be corrected by an operator—this process may continue until the model achieves a high level of accuracy/performance. Supervised learning may utilize approaches including one or more of classification, regression, and/or forecasting.

Semi-supervised learning may be similar to supervised learning, but instead uses both labelled and unlabeled data. Labelled data may comprise information that has meaningful tags so that the model can understand the data (e.g., the input/output pairs described herein), while unlabeled data may lack that information. By using this combination, the machine learning model may learn to label unlabeled data.

For unsupervised learning, the machine learning model may study data to identify patterns. There may be no answer key or human operator to provide instruction. Instead, the model may determine the correlations and relationships by analyzing available data. In an unsupervised learning process, the machine learning model may be left to interpret large data sets and address that data accordingly. The model tries to organize that data in some way to describe its structure. This might mean grouping the data into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values. By defining the rules, the machine learning model then tries to explore different options and possibilities, monitoring and evaluating each result to determine which one is optimal to generate correspondences. Reinforcement learning teaches the model trial and error. The model may learn from past experiences and adapt its approach in response to the situation to achieve the best possible result.

Machine learning component 112 may be configured to store the trained machine learning model. In some implementations, the trained machine learning model may be stored in electronic storage 128.

Given the machine learning model has been trained to generated correspondences between portions of recorded content and records, system 100 may be configured to use the trained machine learning model. For example, recorded content that may have already been uploaded to the collaboration environment may be input into the trained machine learning model along with existing records that were generated from the recorded content (either by users manually or by automation) but not yet having correspondences. In some implementations, users may upload new digital assets representing recorded content. The newly uploaded recorded content may be provided in combination with records as input to the trained machine learning model to generate correspondences as output.

In some implementations, machine learning component 112 may be configured to determine the correspondence information from user input into a user interface. In some implementation, machine learning component 112 may determine a correspondence between temporal content of recorded content of an uploaded digital asset and one or more records.

The machine learning component 112 may be configured to provide information from records, recorded content, and/or other information as input into the trained machine learning model. The trained machine learning model may be configured to provide output including correspondence information and/or other information. The correspondence information may comprise correspondences between temporal content of the recorded content and individual ones of the records. By way of non-limiting illustration, third work information in a third work unit record, and second recorded content may be provided as the input into the trained machine learning model The machine learning component 112 may be configured to obtain the output from the trained machine learning model. The output may include correspondence information and/or other information. By way of non-limiting illustration, the output may include third correspondence information conveying a third correspondence between third temporal content of the second recorded content and the third work unit record.

The machine learning component 112 may be configured to store the correspondence information in the records. In some implementations, the stored correspondence information may facilitate access to the temporal content of the recorded content (i.e., by identifying points in time and/or periods of time within the recorded content).

Machine learning component 112 may be configured to store resource information and/or other information in the work unit records. The resource information may include, and/or may provide access to, digital assets defining the recorded content. The resource information may include copies of the digital assets. The resource information may include links (e.g., pointers, hyperlinks, etc.) to the temporal content in the recorded content. In some implementations, the resource information may include clips or portions of the recorded content that comprise the temporal content separated from the recorded content as a whole.

In some implementations, storing correspondence information and/or resource information in the individual records may cause individual resource identifiers to be presented in individual pages of the individual records. A resource identifier may include a link and/or other interface element. A resource identifier may be selected to cause presentation of temporal content of recorded content. By way of non-limiting illustration, selection of a resource identifier within a page may identify a record and/or may access a digital asset stored in the record by virtue of a correspondence between the digital asset and the record.

In some implementations, user interface component 110 may be configured to effectuate presentation of pages of the collaboration environment. The pages may include and/or provide access to corresponding recorded content, temporal content, and/or other content. By way of non-limiting illustration, a work unit page may be presented on a client computing platform of a user through which the user accesses the third work unit record. The third work unit page may include and/or may provide access to one or more of the third work unit record, the third recorded content, and/or the third temporal content. The user interface component 110 may be configured to effectuate presentation of temporal content. The user interface component 110 may effectuate a playback application configured to present audio and/or visual playback of recorded content. In some implementations, during playback of recorded content, a user interface may be configured to receive user input to correct and/or confirm the correspondence information. By way of non-limiting illustration, upon presentation of temporal content of recorded content, a user may notice that there may be more content within a recording that would be helpful to understand their work at hand. The user may be able to provide input to expand the temporal content to include more portions of the recorded content. Further, upon presentation of temporal content of recorded content, a user may notice that the temporal content includes unnecessary portions of the recorded content. The user may be able to provide input to shorten the temporal content to include a shorter period of time within the recorded content.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, and/or other information.

In some implementations, machine learning component 112 may be configured to automatically generate one or more of records from recorded content based on a trained machine learning model. In some implementations, the trained machine learning model may be the same model or a different model than the model used to generate correspondences. The machine learning component 112 may be configured to, in response to obtaining user input information comprising an upload of a digital asset defining recorded content, generate transcription information and/or other information. The transcription information may characterize audio and/or video content. The transcription information may include transcripts and/or other information. The transcripts may include text strings characterizing one or more of the utterances by users, physical gestures by users, facial expressions by users, physical movement by users, and/or other content. The transcripts may include text strings comprising one or more of the utterances by users, descriptions of the physical gestures by users, descriptions of the facial expressions by users, descriptions of the physical movement by users, and/or other content. In some implementations, generating transcription information from recorded audio may include performing speech processing on the recorded audio content and/or other processing. In some implementations, transcription information may be generated in response to specific user input requesting the generation of the transcription information following the input of the digital assets.

The machine learning component 112 may be configured to train and/or utilize a machine learning model to generate individual records based on transcription information and/or other information. In some implementations, an individual record may be generated by determining information describing the individual record as part of the environment state information. Determining work information may include specifying values for one or more parameters.

The machine learning component 112 may be configured to obtain and/or derive the text corpus comprising text making up pages (e.g., work unit pages, project pages, etc.) for existing records of the collaboration environment. The machine learning component 112 may be configured to compile the text from the text corpus and the values from the existing records into the input/output pairs. The machine learning component 112 may be configured to train the machine learning model based on multiple sets of input/output pairs to generate the trained machine learning model.

The training process may continue until the model achieves a desired level of accuracy on the training data. The machine learning component 112 may be configured to store the trained machine learning model. By using the existing records and text of pages, the trained machine learning model may be trained in a way that already reflects how users create records. The text corpus provides insight on how users actually define elements of a record (e.g., by the words they use). By using this text in relation to how the records are ultimately defined and stored by the system 100, the trained machine learning model may be well adapted to generate records from the transcripts.

In some implementations, a text corpus may be derived from existing records of some or all users of the system 100 and used to train a machine learning model that applies to some or all users. In some implementations, a text corpus may be derived from a set of existing records specific to a set of users and used to train a machine learning model that is specific to the set of users. By way of non-limiting illustration, a set of users may be associated with a given business entity such that the business entity may have an account within system 100 which provides access to the set of users (e.g., it's employees). The text corpus may be derived from the set of existing records such that the resulting trained machine learning model may be particularly adapted to the style, grammar, preferences, lexicography, and/or other attributes particular to the set of users. By adapting the machine learning model to a specific set of users, the output from the training machine learning model may be more accurate and/or relevant for that set of users.

The machine learning component 112 may be configured to provide the transcription information and/or other information as input into the trained machine-learning model. The trained machine-learning model may be configured to provide output including new ones of the records. The machine learning component 112 may be configured to obtain the output from the trained machine-learning model. The output including new ones of the records may include specification of one or more values of one or more parameters. In some implementations, individual values may include individual text and/or text strings from the transcripts. In some implementations, individual values may include individual meanings of the utterances. In some implementations, individual values may include individual features and/or characterizations thereof.

In some implementations, the machine learning component 112 may be configured to provide information from the new ones of the records and the recorded content from which the new ones of the records were generated into the trained machine learning model to determine correspondences between the new ones of the records and temporal content in the recorded content.

Figures 4, 5:
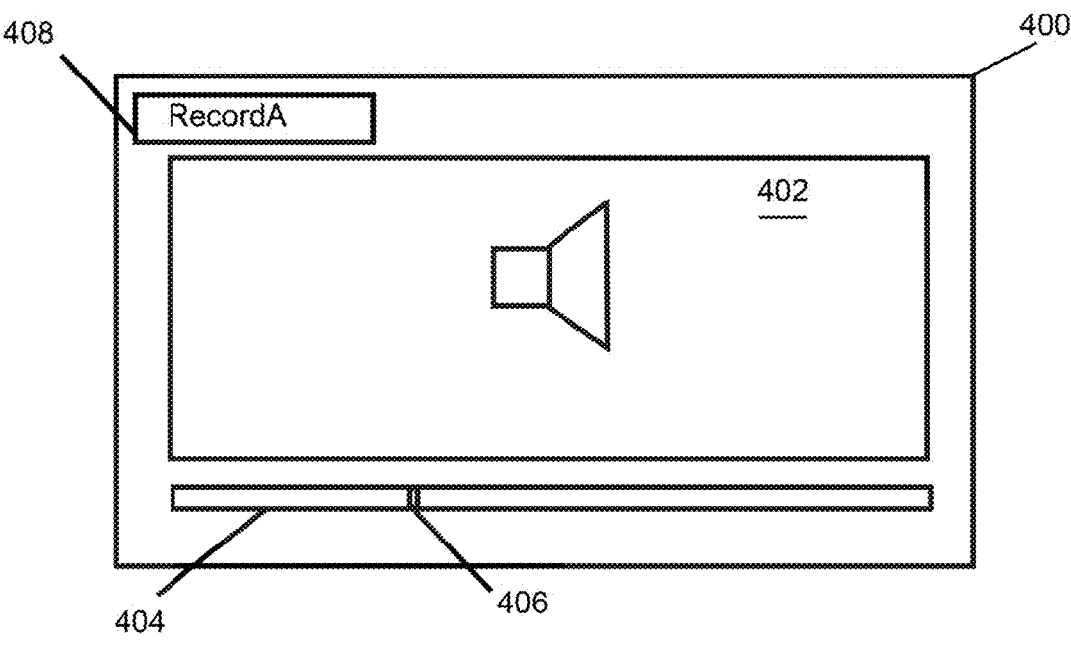
FIG. 4 illustrates a user interface, in accordance with one or more implementations.
FIG. 5 illustrates a user interface, in accordance with one or more implementations.

FIG. 4 illustrates a user interface 400, in accordance with one or more implementations. The users may access recorded content and/or provide user input through instances of the user interface 400. The user interface 400 may include one or more portions. A portion 402 may include playback portion through which a user may view and/or listen to recorded content. The playback portion may be configured to receive user input which may include identification of the temporal content for the correspondences. A portion may include a temporal selection portion 404 (e.g., sliding bar and/or other interface element(s)) to direct the recorded content to one or more points in time. The temporal selection portion 404 may include one or more time indicators, such as indicator 406, for selecting one or more points in time. A user may provide input to save and/or timestamp one or more points in time, for example, through selection of a virtual button (not shown). A user may input to save and/or timestamp a section of the recorded content between multiple points in time to specify a period of time within the recorded content. A portion 408 may be provided where a user can select and/or input a particular record (e.g., by title and/or other identifying information) to associate with the point in time and/or period in time thereby specifying a user-provided correspondence.

FIG. 5 illustrates a user interface 500 of a collaboration environment, in accordance with one or more implementations. The user interface 500 may include a view of a collaboration environment. In particular, the user interface 500 may comprise a work unit page 502 for a unit of work 501. The user interface 500 may display values of one or more work unit parameters, and/or other information. By way of non-limiting illustration, a user interface element 501 may display a title of the unit of work 501. A user interface element 503 may display a due date of unit of work 501. A user interface element 505 may display an assignee of unit of work 501. A user interface element 504 may display a description of the unit of work 501. The work unit page 502 may include a link 506 to a digital asset associated with the unit of work 501 by virtue of a correspondence determined through machine learning, which may be stored in a work unit record. Selection of the link 506 may cause presentation of recorded content defined by the digital asset. Selection of the link 506 may cause presentation of temporal content within the recorded content that specifically corresponds to the unit of work 501. A playback window, the same as or similar to FIG. 4, may be displayed to present the temporal content. A user may provide input to adjust and/or confirm the temporal content. The confirmation and/or adjustment may be fed back into the model to refine the model.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
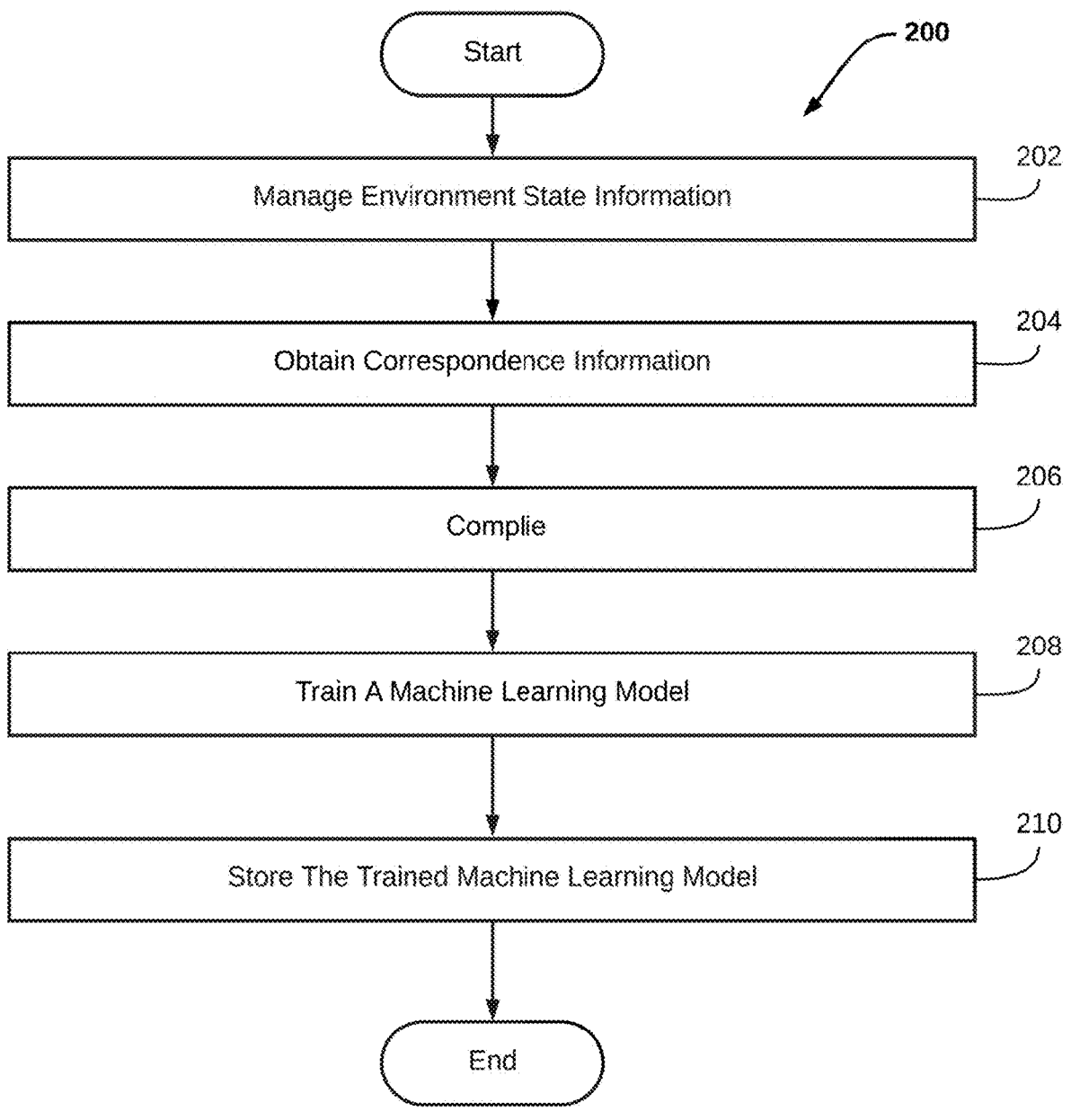
FIG. 2 illustrates a method to train a machine learning model to generate correspondences between portions of recorded content and records of a collaboration environment, in accordance with one or more implementations.

FIG. 2 illustrates a method 200 to train a machine learning model to generate correspondences between portions of recorded content and work unit records of a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include one or more records. The one or more records may include work unit records and/or other records. The work unit records may include work information and/or other information. The work information may characterize units of work created, managed, and/or assigned to within the collaboration environment to the users who are expected to accomplish one or more actions to complete the units of work. The work information may comprise values of work unit parameters. The work unit records may include a first work unit record for a first unit of work and a second work unit record for a second unit of work. Operation 202 may be performed by one or more hardware processors configured by machine-readable instructions including a component that is the same as or similar to environment state component 108, in accordance with one or more implementations.

An operation 204 may obtain correspondence information and/or other information. The correspondence information may convey user-provided correspondences between temporal content of recorded content and one or more of the work unit records. The recorded content may include utterances by one or more of the users. The temporal content may correspond to points in time and/or periods of time within the recorded content. First correspondence information may convey a first correspondence between first temporal content of first recorded content and the first work unit record, and second correspondence information may convey a second correspondence between second temporal content of the first recorded content and the second work unit record. Operation 204 may be performed by one or more hardware processors configured by machine-readable instructions including a component that is the same as or similar to user interface component 110, in accordance with one or more implementations.

An operation 206 may compile the correspondence information, information of the one or more of records, and/or other information into input/output pairs. The input/output pairs may include training input information, training output information, and/or other information. The training input information for an individual input/output pair may include the correspondence information for an individual one of the recorded content. The training output information for the individual input/output pair may include the information for an individual record. By way of non-limiting illustration, the first correspondence information and the information for the first work unit record may be compiled into a first input/output pair, and the second correspondence information and the information for the second work unit record may be compiled into a second input/output pair. Operation 206 may be performed by one or more hardware processors configured by machine-readable instructions including a component that is the same as or similar to machine learning component 112, in accordance with one or more implementations.

An operation 208 may train a machine learning model based on the input/output pairs to generate a trained machine learning model. The trained machine learning model may be configured to generate the correspondences between the temporal content of the recorded content and the work unit records. The machine learning model may be trained using the first input/output pair and the second input/output pair to generate the trained machine learning model. Operation 208 may be performed by one or more hardware processors configured by machine-readable instructions including a component that is the same as or similar to machine learning component 112, in accordance with one or more implementations.

An operation 210 may store the trained machine learning model. Operation 210 may be performed by one or more hardware processors configured by machine-readable instructions including a component that is the same as or similar to machine learning component 112, in accordance with one or more implementations.

Figure 3:
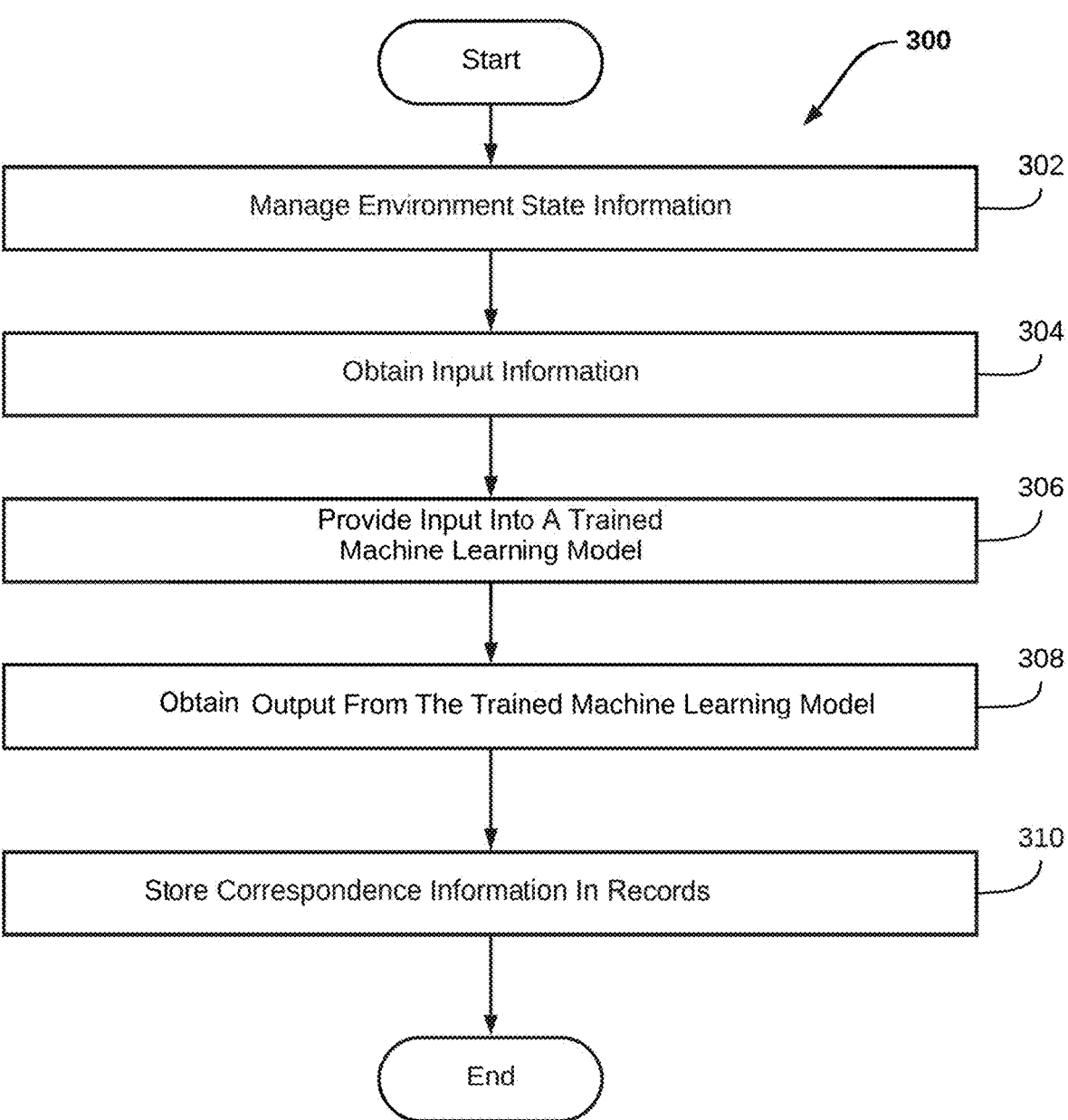
FIG. 3 illustrates a method to generate correspondences between portions of recorded content and records of a collaboration environment using a trained machine learning model.

FIG. 3 illustrates a method 300 to generate correspondences between portions of recorded content and records of a collaboration environment using a trained machine learning model. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may manage environment state information maintaining a collaboration environment. The collaboration environment may be configured to facilitate interaction by users with the collaboration environment. The environment state information may include one or more records. The one or more records may include work unit records and/or other records. The work unit records may include work information and/or other information. The work information may characterize units of work created, managed, and/or assigned to within the collaboration environment to the users who are expected to accomplish one or more actions to complete the units of work. The work information may comprise values of work unit parameters. The work unit records may include a first work unit record. The first work unit record may include first work information characterizing a first unit of work. Operation 302 may be performed by one or more hardware processors configured by machine-readable instructions including a component that is the same as or similar to environment state component 108, in accordance with one or more implementations.

An operation 304 may obtain input information and/or other information. The input information may define recorded content and/or other content. The recorded content may include utterances by one or more of the users. The input information may include first input information defining first recorded content. Operation 304 may be performed by one or more hardware processors configured by machine-readable instructions including a component that is the same as or similar to user interface component 110, in accordance with one or more implementations.

An operation 306 may provide information from records and the input information defining the recorded content as input into a trained machine learning model. The trained machine learning model may be configured to provide output including correspondence information and/or other information. The correspondence information may comprise correspondences between temporal content of the recorded content and the records. The temporal content may correspond to points in time and/or periods of time within the recorded content and/or other content. By way of non-limiting illustration, the first work information and the first input information may be provided as the input into the trained machine learning model. Operation 306 may be performed by one or more hardware processors configured by machine-readable instructions including a component that is the same as or similar to machine learning component 112, in accordance with one or more implementations.

An operation 308 may obtain the output from the trained machine learning model. The output may include first correspondence information and/or other information. The first correspondence information may convey a first correspondence between first temporal content of the first recorded content and the first work unit record. Operation 308 may be performed by one or more hardware processors configured by machine-readable instructions including a component that is the same as or similar to machine learning component 112, in accordance with one or more implementations.

An operation 310 may store the correspondence information in the work unit records and/or other records. The first correspondence information may be stored in the first work unit record. Operation 310 may be performed by one or more hardware processors configured by machine-readable instructions including a component that is that same as or similar to machine learning component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to train a machine learning model to generate correspondences between portions of recorded audio content and work unit records of a collaboration environment, the system comprising:

non-transitory electronic storage storing environment state information maintaining a collaboration environment, the environment state information including work unit records for units of work, the work unit records including a first work unit record and a second work unit record, wherein the first work unit record includes first work information characterizing a first unit of work, and first resource information including a first digital asset, the first digital asset defining an instance of first temporal content of first recorded audio content for which a first correspondence to the first work unit record has been established, and wherein the second work unit record includes second work information characterizing a second unit of work, and second resource information including a second digital asset, the second digital asset defining an instance of second temporal content of the first recorded audio content for which a second correspondence to the second work unit record has been established; and one or more physical processors configured by machine-readable instructions to:

manage the environment state information to facilitate interaction by users with the collaboration environment;

obtain correspondence information conveying correspondences between temporal content of recorded audio content and one or more of the work unit records, the temporal content corresponding to points in time and/or periods of time the users have identified within the recorded audio content, such that first correspondence information conveys the first correspondence between the first temporal content of the first recorded audio content and the first work unit record, and second correspondence information conveys the second correspondence between the second temporal content of the first recorded audio content and the second work unit record;

compile the correspondence information and information of the one or more of the work unit records into model training information, such that the first correspondence information, the first work information, the second correspondence information, and the second work information are compiled into the model training information;

train a machine learning model based on the model training information to generate a trained machine learning model, the trained machine learning model being configured to generate the correspondences between the temporal content of the recorded audio content and the work unit records;

obtain user input information conveying user input into instances of a graphical user interface including instances of a playback window through which the users play back the recorded audio content and effectuate adjustments to the points in time and/or the periods of time within the recorded audio content that identify the temporal content, the adjustments being effectuated through interaction with instances of a time slider element displayed in the instances of the playback window; and refine the trained machine learning model in response to the first temporal content of the first recorded audio content being adjusted to first adjusted temporal content.

2. The system of claim 1, wherein the one or more physical processors are further configured by the machine-readable instructions to:

effectuate presentation of the instances of the graphical user interface including the instances of the playback window on client computing platforms.

3. The system of claim 2, wherein the presentation of the instances of the graphical user interface through which the users access the recorded audio content is limited to the users that are linked to the recorded audio content.

4. The system of claim 3, wherein the users that are linked to the recorded audio content include one or more of creators of the recorded audio content, assignees of individual ones of the work unit records, one or more specifically authorized users, or one or more of the users who participated in the recorded audio content.

5. A system configured to generate correspondences between portions of recorded audio content and work unit records of a collaboration environment using a trained machine learning model, the system comprising:

non-transitory electronic storage storing environment state information maintaining a collaboration environment, the environment state information including work unit records for units of work, the work unit records including a first work unit record and a second work unit record, the first work unit record including first work information characterizing a first unit of work, and first resource information defining a first digital asset, the first digital asset defining an instance of first temporal content of first recorded audio content for which a first correspondence to the first work unit record has been established, and the second work unit record including second work information characterizing a second unit of work; and one or more physical processors configured by machine-readable instructions to:

manage the environment state information to facilitate interaction by users with the collaboration environment;

obtain first input information defining second recorded audio content, the second recorded audio content including utterances by one or more of the users;

provide the second work information and the first input information as input into a trained machine learning model, the trained machine learning model having been trained based on prior user identification of points in time and/or periods of time within a training set of recorded audio content, the trained machine learning model being configured to provide output including correspondence information, the correspondence information comprising correspondences between temporal content of recorded audio content and the work unit records;

obtain the output from the trained machine learning model, the output including first correspondence information conveying a second correspondence between second temporal content of the second recorded audio content and the second work unit record;

store, in the second work unit record, the first correspondence information and second resource information including a second digital asset defining an instance of the second temporal content;

obtain user input information conveying user input into instances of a graphical user interface including instances of a playback window through which the users play back the recorded audio content and effectuate adjustments to points in time and/or periods of time within the recorded audio content that identify the temporal content, the adjustments being effectuated through interaction with instances of a time slider element displayed in the instances of the playback window; and refine the trained machine learning model in response to the second temporal content of the second recorded audio content being adjusted to first adjusted temporal content.

6. The system of claim 5, wherein the one or more physical processors are further configured by the machine-readable instructions to:

effectuate presentation of a first work unit page through which the first work unit record is accessed, the first work unit page including and/or providing access to the first recorded audio content and/or the first temporal content.

7. The system of claim 6, wherein the access to the first recorded audio content and/or the first temporal content is facilitated by resource identifiers appearing on the first work unit page.

8. The system of claim 5, wherein the one or more physical processors are further configured by the machine-readable instructions to:

generate the first work unit record from the first recorded audio content.

9. The system of claim 8, wherein generating the first work unit record is performed by the trained machine learning model or another trained machine learning model.

10. The system of claim 5, wherein access to the instances of the playback window through which the users effectuate adjustments to the points in time and/or the periods of time within the recorded audio content that identify the temporal content is limited to the users linked to the recorded audio content.

11. A method to train a machine learning model to generate correspondences between portions of recorded audio content and work unit records of a collaboration environment, the method comprising:

storing environment state information maintaining a collaboration environment, the environment state information including work unit records for units of work, the work unit records including a first work unit record and a second work unit record, wherein the first work unit record includes first work information characterizing a first unit of work, and first resource information including a first digital asset, the first digital asset defining an instance of first temporal content of first recorded audio content for which a first correspondence to the first work unit record has been established, and wherein the second work unit record includes second work information characterizing a second unit of work and second resource information including a second digital asset, the second digital asset defining an instance of second temporal content of the first recorded audio content for which a second correspondence to the second work unit record has been established;

managing the environment state information to facilitate interaction by users with the collaboration environment;

obtaining correspondence information conveying correspondences between temporal content of recorded audio content and one or more of the work unit records, the temporal content corresponding to points in time and/or periods of time the users have identified within the recorded audio content, the correspondence information including first correspondence information conveying the first correspondence between the first temporal content of the first recorded audio content and the first work unit record, and second correspondence information conveying the second correspondence between the second temporal content of the first recorded audio content and the second work unit record;

compiling the correspondence information and information of the one or more of the work unit records into model training information, such that the first correspondence information, the first work information, the second correspondence information, and the second work information are compiled into the model training information;

training a machine learning model based on the model training information to generate a trained machine learning model, the trained machine learning model being configured to generate the correspondences between the temporal content of the recorded audio content and the work unit records;

obtaining user input information conveying user input into instances of a graphical user interface including instances of a playback window through which the users play back the recorded audio content and effectuate adjustments to the points in time and/or the periods of time within the recorded audio content that identify the temporal content, the adjustments being effectuated through interaction with instances of a time slider element displayed in the instances of the playback window; and refining the trained machine learning model in response to the first temporal content of the first recorded audio content being adjusted to first adjusted temporal content.

12. The method of claim 11, further comprising:

effectuating presentation of the instances of the graphical user interface including the instances of the playback window on client computing platforms.

13. The method of claim 12, wherein the presentation of the instances of the graphical user interface through which the users access the recorded audio content is limited to the users that are linked to the recorded audio content.

14. The method of claim 13, wherein the users that are linked to the recorded audio content include one or more of creators of the recorded audio content, assignees of individual ones of the work unit records, one or more specifically authorized users, or one or more of the users who participated in the recorded audio content.

15. A method configured to generate correspondences between portions of recorded audio content and work unit records of a collaboration environment using a trained machine learning model, the method comprising:

storing environment state information maintaining a collaboration environment, the environment state information including work unit records for units of work, the work unit records including a first work unit record and a second work unit record, the first work unit record including first work information characterizing a first unit of work, and first resource information defining a first digital asset, the first digital asset defining an instance of first temporal content of first recorded audio content for which a first correspondence to the first work unit record has been established, and the second work unit record including second work information characterizing a second unit of work;

managing the environment state information to facilitate interaction by users with the collaboration environment;

obtaining first input information defining second recorded audio content, the second recorded audio content including utterances by one or more of the users;

providing the second work information and the first input information as input into a trained machine learning model, the trained machine learning model having been trained based on prior user identification of points in time and/or periods of time within a training set of recorded audio content, the trained machine learning model being configured to provide output including correspondence information, the correspondence information comprising correspondences between temporal content of recorded audio content and the work unit records;

obtaining the output from the trained machine learning model, the output including first correspondence information conveying a second correspondence between second temporal content of the second recorded audio content and the second work unit record;

storing, in the second work unit record, the first correspondence information and second resource information including a second digital asset defining an instance of the second temporal content;

obtaining user input information conveying user input into instances of a graphical user interface including instances of a playback window through which the users play back the recorded audio content and effectuate adjustments to points in time and/or periods of time within the recorded audio content that identify the temporal content, the adjustments being effectuated through interaction with instances of a time slider element displayed in the instances of the playback window; and refining the trained machine learning model in response to the second temporal content of the second recorded audio content being adjusted to first adjusted temporal content.

16. The method of claim 15, further comprising:

effectuating presentation of a first work unit page through which the first work unit record is accessed, the first work unit page including and/or providing access to the first recorded audio content and/or the first temporal content.

17. The method of claim 16, wherein the access to the first recorded audio content and/or the first temporal content is facilitated by resource identifiers appearing on the first work unit page.

18. The method of claim 15, further comprising:

generating the first work unit record from the first recorded audio content.

19. The method of claim 18, wherein the generating the first work unit record is performed by the trained machine learning model or another trained machine learning model.

20. The method of claim 15, wherein access to the instances of the playback window through which the users effectuate adjustments to the points in time and/or the periods of time within the recorded audio content that identify the temporal content is limited to the users linked to the recorded audio content.

* * * * *